United States Patent
Enami (10) Patent No.: US 8,866,761 B2
(45) Date of Patent: Oct. 21, 2014

(54) OPERATION DISPLAY DEVICE AND OPERATION DISPLAY METHOD

(75) Inventor: Eiji Enami, Kanagawa (JP)

(73) Assignee: Ricoh Company, Limited, Tokyo (JP)

(*) Notice: Subject to any disclaimer, the term of this patent is extended or adjusted under 35 U.S.C. 154(b) by 99 days.

(21) Appl. No.: 13/137,402

(22) Filed: Aug. 11, 2011

(65) Prior Publication Data

US 2012/0044169 A1 Feb. 23, 2012

(30) Foreign Application Priority Data

Aug. 19, 2010 (JP) ................................. 2010-184257

(51) Int. Cl.
*G06F 3/041* (2006.01)
*G06F 3/045* (2006.01)
*H04N 1/00* (2006.01)
*G06F 3/0482* (2013.01)
*H04N 1/32* (2006.01)
*G03G 15/00* (2006.01)

(52) U.S. Cl.
CPC .......... *G06F 3/0414* (2013.01); *H04N 1/00413* (2013.01); *G06F 3/0482* (2013.01); *H04N 1/32593* (2013.01); *H04N 1/00482* (2013.01); *G06F 3/041* (2013.01); *H04N 2201/0094* (2013.01); *H04N 1/0044* (2013.01); *H04N 1/00474* (2013.01); *G03G 15/502* (2013.01)
USPC .......................................... 345/173; 345/174

(58) Field of Classification Search
None
See application file for complete search history.

(56) References Cited

U.S. PATENT DOCUMENTS

| 7,633,508 | B2 | 12/2009 | Enami et al. | |
|---|---|---|---|---|
| 2004/0108995 | A1* | 6/2004 | Hoshino et al. | 345/173 |
| 2005/0275632 | A1* | 12/2005 | Pu et al. | 345/171 |
| 2006/0181520 | A1* | 8/2006 | Ikegawa | 345/173 |
| 2007/0057961 | A1 | 3/2007 | Enami et al. | |
| 2008/0055269 | A1* | 3/2008 | Lemay et al. | 345/173 |
| 2008/0313568 | A1* | 12/2008 | Park et al. | 715/835 |
| 2010/0017710 | A1* | 1/2010 | Kim et al. | 715/702 |
| 2010/0033748 | A1 | 2/2010 | Enami et al. | |
| 2010/0225599 | A1* | 9/2010 | Danielsson et al. | 345/173 |
| 2010/0231553 | A1 | 9/2010 | Yabuuchi et al. | |

FOREIGN PATENT DOCUMENTS

| JP | 2004-086733 | 3/2004 |
|---|---|---|
| JP | 2004220444 A | 8/2004 |
| JP | 2008073917 A | 4/2008 |

OTHER PUBLICATIONS

Office Action for corresponding Japanese patent application No. 20110-184257 dated Jan. 28, 2014.

* cited by examiner

*Primary Examiner* — Alexander Eisen
*Assistant Examiner* — Nan-Ying Yang
(74) *Attorney, Agent, or Firm* — Harness, Dickey & Pierce, P.L.C.

(57) ABSTRACT

An operation display device includes: a display unit that displays an image; a touch panel that is mounted on the display unit; a detecting unit that detects a pressed position on the touch panel and detects a pressing force against the touch panel; and an execution control unit.
The execution control unit, if the pressing force is more than a predetermined threshold, executes a first function that is predetermined in accordance with the pressed position and, if the pressing force is equal to or less than the threshold, executes a second function that is predetermined in accordance with the pressed position.

4 Claims, 10 Drawing Sheets

OPERATION DISPLAY DEVICE AND OPERATION DISPLAY METHOD

CROSS-REFERENCE TO RELATED APPLICATIONS

The present application claims priority to and incorporates by reference the entire contents of Japanese Patent Application No. 2010-184257 filed in Japan on Aug. 19, 2010.

BACKGROUND OF THE INVENTION

1. Field of the Invention

The present invention relates to an operation display device and an operation display method.

2. Description of the Related Art

An operation panel, or the like, of a multi function peripheral (MFP) usually has lower resolution than a personal computer (PC), or the like; therefore, it is difficult to arrange a large number of icons or buttons on a screen. To achieve desired operability, a touch panel is often adopted as an input unit; however, in such a case, it is difficult to assign a plurality of operations to a single icon or button. Hence, a large number of operation hierarchies are required to perform a certain operation, and it is difficult to select a plurality of input units, which causes poor operability.

For example, it is difficult, for an operation panel with a touch panel, to use an input method, such as clicking the right mouse button, to display explanations of a function and operation related to the displayed icon or button.

Japanese Patent Application Laid-open No. 2008-073917 discloses an operation display device with a touch panel in which a display unit displays function keys that correspond to various operations, the surface of the display unit is made up of a touch panel, and at least one of the function keys is a help key. In this operation display device, if a first function key out of the function keys is pressed while the help key is being pressed, a help screen for the first function key is displayed.

The method disclosed in Japanese Patent Application Laid-open No. 2008-073917 has a problem in that the usability of a touch-panel input device is not sufficiently improved. For example, because a specific button (a help key) is added, it is difficult to display more functions on a single screen. Furthermore, because it is necessary to press a plurality of points of the help key and a function key at the same time, a problem of poor usability occurs.

SUMMARY OF THE INVENTION

It is an object of the present invention to at least partially solve the problems in the conventional technology.

According to an aspect of the present invention, an operation display device includes: a display unit that displays an image; a touch panel that is mounted on the display unit; a detecting unit that detects a pressed position on the touch panel and detects a pressing force against the touch panel; and an execution control unit. The execution control unit, if the pressing force is more than a predetermined threshold, executes a first function that is predetermined in accordance with the pressed position and, if the pressing force is equal to or less than the threshold, executes a second function that is predetermined in accordance with the pressed position.

According to another aspect of the present invention, operation display method performed by an operation display device, the operation display device includes: a display unit that displays an image; and a touch panel that is mounted on the display unit. The operation display method includes: detecting a pressed position on the touch panel and a pressing force with respect to the touch panel; and executing, if the pressing force is more than a predetermined threshold, a first function that is predetermined in accordance with the pressed position and, if the pressing force is equal to or less than the threshold, a second function that is predetermined in accordance with the pressed position.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of an operation display device and an operation display method according to the present invention are explained in detail below with reference to the accompanying drawings. In the following descriptions, an explanation is given of, for example, an image forming apparatus, such as an MFP, that includes an operation display device; however, an applicable apparatus is not limited to an image forming apparatus.

First Embodiment

An image forming apparatus according to a first embodiment has a configuration such that the level with which a touch panel is pressed (hereafter, pressing level) has two levels of detection, i.e., high and low, and, even if the same coordinates are pressed to input an instruction, two different inputs can be obtained. Thus, two processes can be assigned to a single symbol, such as an icon, button, or key, that is an image that can be designated and selected. For instance, it can be controlled such that, when a button is pressed hard, an operation of a function of the button per se is performed and, when the button is pressed softly, a different operation may be performed.

Figure 1:
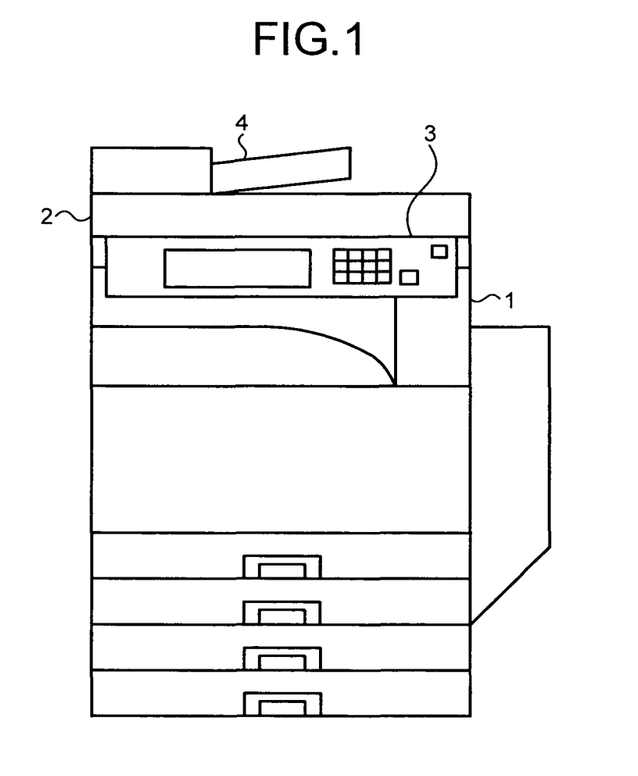
FIG. 1 is a diagram that illustrates the overall configuration of an image forming apparatus that includes an operation display device according to a first embodiment.

FIG. 1 is a diagram that illustrates the overall configuration of an image forming apparatus that includes an operation display device according to the first embodiment. The image forming apparatus according to the first embodiment includes a system controller 1 that is a main body section, a scanner unit 2, an operation panel 3, and an auto reverse document feeder (ARDF) 4.

The system controller 1, which is a main system, controls the overall image forming apparatus. Upon receiving an operation execution instruction from an operator via the operation panel 3, the system controller 1 performs a process in accordance with the contents of the instruction. For example, the system controller 1 performs image formation of an original that is read in by the scanner unit 2. The operation panel 3 displays various operation screens of the menu screen on a display panel (not illustrated) in accordance with an instruction from the system controller 1. Upon receiving an operation execution instruction from an operator, the operation panel 3 notifies the system controller 1 of the contents of the instruction.

Figure 2:
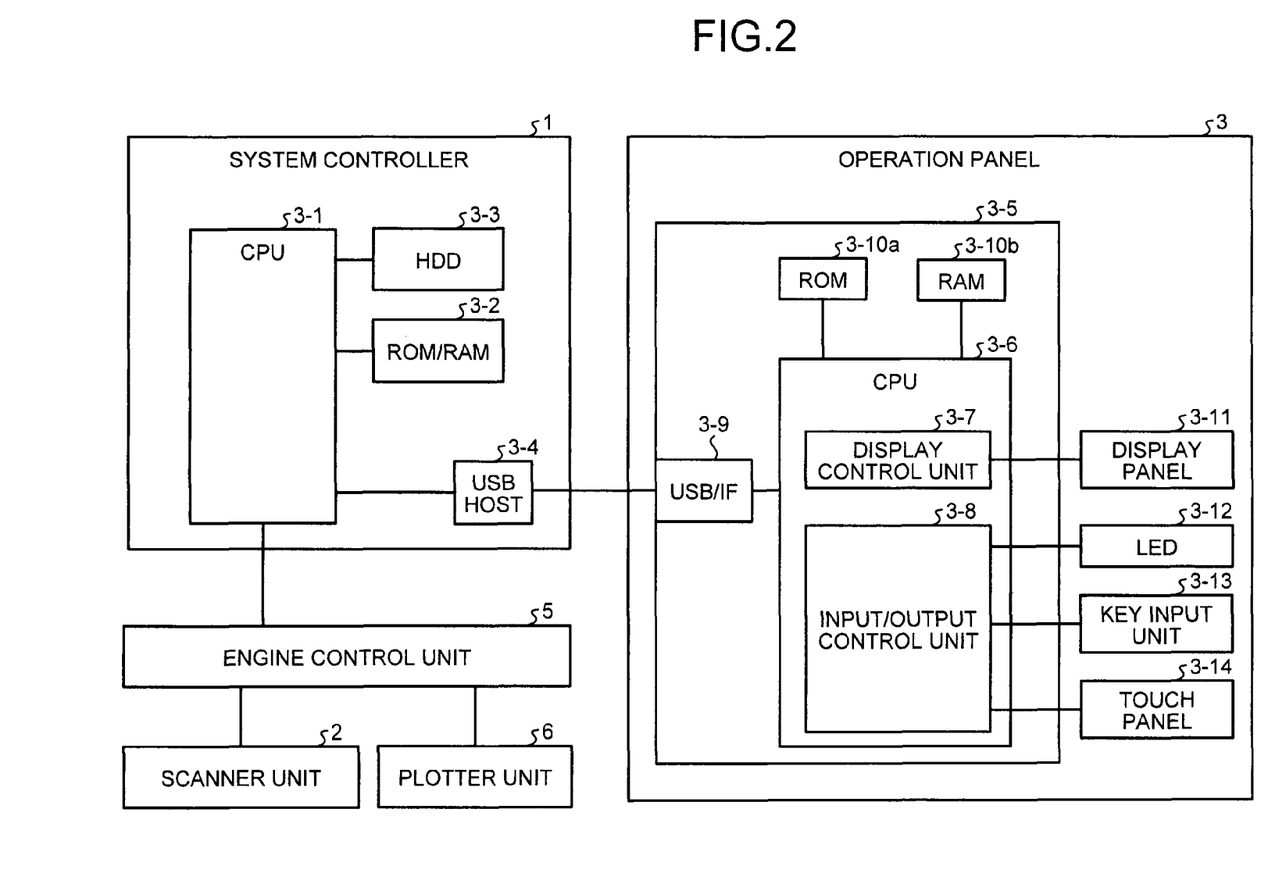
FIG. 2 is a diagram that illustrates a configuration example of the image forming apparatus according to the first embodiment.

FIG. 2 is a diagram that illustrates a configuration example of the image forming apparatus according to the first embodiment. FIG. 2 illustrates that the image forming apparatus according to the first embodiment further includes a plotter unit 6 that forms and outputs images on a medium and includes an engine control unit 5 that controls the scanner unit 2 and the plotter unit 6.

The system controller 1 includes a central processing unit (CPU) 3-1, a read only memory (ROM)/a random access memory (RAM) 3-2, a hard disk drive (HDD) 3-3, and a universal serial bus (USB) HOST 3-4.

The CPU 3-1 manages and controls internal information on the image forming apparatus. The ROM/RAM 3-2 is a storage unit that stores system-controller CPU control programs, work data, and the like. The HDD 3-3 is a storage unit that stores system-controller CPU programs, image data, and the like. The USB HOST 3-4 is an interface for communication with the operation panel 3.

The operation panel 3 includes a panel control unit 3-5, a display panel 3-11 that is a display unit implemented by using a liquid crystal display, or the like, an LED 3-12, a key input unit 3-13, and a touch panel 3-14. The panel control unit 3-5, for example, generates data for various operation screens to be displayed externally (for an operator). The display panel 3-11 displays an operation screen according to the operation screen data generated by the panel control unit 3-5. The LED 3-12 is an output unit that provides external notification of the operating state, or the like, of the image forming apparatus. The touch panel 3-14 receives an operation execution instruction from an operator.

The panel control unit 3-5 further includes a CPU 3-6, a USB I/F 3-9, a ROM 3-10a, and a RAM 3-10b.

The CPU 3-6 is an operation-panel CPU that executes an operation-screen management application. The USB I/F 3-9 is a USB-communication interface that sends and receives various types of information to and from the USB HOST 3-4 of the system controller 1. The ROM 3-10a is a storage unit that stores operation-panel CPU control programs, screen configuration data used for displaying operation screens, and the like. The RAM 3-10b is a storage unit that stores work data and the like.

A display control unit 3-7 and an input/output control unit 3-8 are implemented by the CPU 3-6. The display control unit 3-7 executes an application that manages operation screens so as to control the display panel 3-11. The input/output control unit 3-8 controls various input/output units (the LED 3-12, the key input unit 3-13, and the touch panel 3-14).

In order to display an operation screen in accordance with the state of the image forming apparatus, the system controller 1 designates, out of a plurality of function applications included in the image forming apparatus, an application to be displayed and operated on the operation panel 3. The system controller 1 sends, to the CPU 3-6 of the operation panel 3 via the USB HOST 3-4, display-content instruction information that is information to specify an operable application. Furthermore, the system controller 1 sends, to the CPU 3-6 of the operation panel 3 via the USB HOST 3-4, device information, such as the remaining amount of sheets in a feed tray, the remaining amount of toner, and peripheral-device connection information as well as the display-content instruction information.

The CPU 3-6 of the operation panel 3 executes an operation-screen management application. The operation-screen management application reads out screen configuration data from the ROM 3-10a by using display-content instruction information that is sent from the system controller 1 and generates a corresponding display screen on which the device information sent from the system controller 1 is reflected. The generated display screen is temporarily stored in the RAM 3-10b of the panel control unit 3-5. The display control unit 3-7 of the CPU 3-6 reads the display screen again so as to output display-panel data so that the operation screen is displayed on the display panel 3-11.

The system controller 1 sends, to the operation panel 3, information as to whether the light of the LED 3-12 is to be turned on/off according to internal information on the image forming apparatus so that the LED 3-12 is turned on or off.

When the key input unit 3-13 or the touch panel 3-14 on the screen receives an input from an operator, the key input unit 3-13 or the touch panel 3-14 sends, to the input/output control unit 3-8 in the CPU 3-6, electric signals that indicate the key number, the coordinates (touch-panel coordinates) on the touch panel 3-14, and the like. The input key number or touch-panel coordinates are recognized by processing performed by the CPU 3-6.

The key number or the touch-panel coordinates causes an action that is determined in accordance with the device state or the screen display. For instance, if the start key is pressed on the copy screen, an event for the copy start is generated. If a feed-tray change button is touched, an event for the feed-tray change is generated. If the above described event is generated in the operation-screen management application, the contents of the event are sent to the CPU 3-1 of the system controller 1 via the USB I/F 3-9. The CPU 3-1 of the system controller 1 functions as an execution control unit. The execution control unit determines the contents of a process to be performed by using the device state and the received event content and then executes the process. For example, the contents of a process include the start of a copy operation, sending of new screen configuration data to the operation panel 3, and the like.

A configuration may be such that the display control unit 3-7 and the input/output control unit 3-8 or the CPU 3-6 including them is integrated with the CPU 3-1 of the system controller 1. The communication interface may be a communication unit other than a USB. According to the present embodiment, a configuration is such that the CPU 3-6 that executes a control program (operation-screen management application) is used; however, a device that does not include an execution unit (CPU) using a control program may be implemented. Although a configuration is such that the system controller 1 and the operation panel 3 are separated from each other, it is appropriately determined whether or not they are separated from each other according to the shape and size of the device, the system arrangement, or the like; therefore, a configuration may be such that they are integrated into one.

Figure 3:
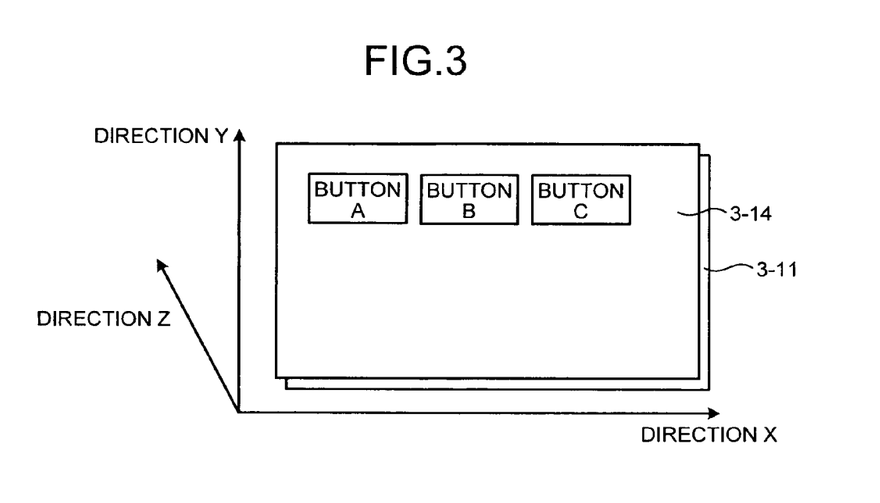
FIG. 3 is a diagram that illustrates the details of a touch panel.

FIG. 3 is a diagram that illustrates the details of the touch panel 3-14. The touch panel 3-14 is arranged to overlay the top surface of the display panel 3-11. An operator can visually check, through the touch panel 3-14, the contents (button A to C, and the like) displayed on the display panel 3-11. When any point on the touch panel 3-14 is pressed (hereafter, pressed position), analog voltage values, which are continuous values, corresponding to the pressed position in the directions X and Y and the pressing force in the direction Z are generated and sent to the input/output control unit 3-8 of the panel control unit 3-5 of the operation panel 3. The input/output control unit 3-8 functions as a detecting unit that detects the pressed position on the touch panel and the force with which the touch panel is pressed (hereafter, pressing force).

The pressing force indicates the degree of pressure applied to the touch panel 3-14. The pressing force can be detected by using, for example, an electric resistance value acquired from the touch panel 3-14, a capacitance detection value acquired from the touch panel 3-14, or the like according to the touch panel system.

Depending on the configuration of the touch panel 3-14, it is determined whether the respective values in the directions X, Y, and Z can be read out at the same time or any one of the values can be read out according to a setting.

A configuration may be such that a device other than the panel control unit 3-5 detects the generated analog voltage value, converts the generated analog voltage value into digital data, and sends the digital data to the panel control unit 3-5.

The panel control unit 3-5 converts the detected analog voltage values or digital data received from the above-described external device into X, Y, and Z coordinate values on the display area and then sends the coordinate values to the CPU 3-1 of the system controller 1.

The X and Y coordinate values may be easy-to-use if they conform to the resolution of the display panel 3-11. For instance, if the display resolution in the direction X is 800 dpi, the touch-panel detection coordinate value is set to any one of 0 to 800 based on the detected analog voltage value and then sent to the CPU 3-1. As for the Z coordinate value, because it is usually difficult for an operator to selectively press a point with a pressing force in more than a few different levels accurately, it is appropriate to use three levels (two levels in the pressed state), i.e., (1) not pressed, (2) lightly pressed, and (3) pressed hard.

Figure 4:
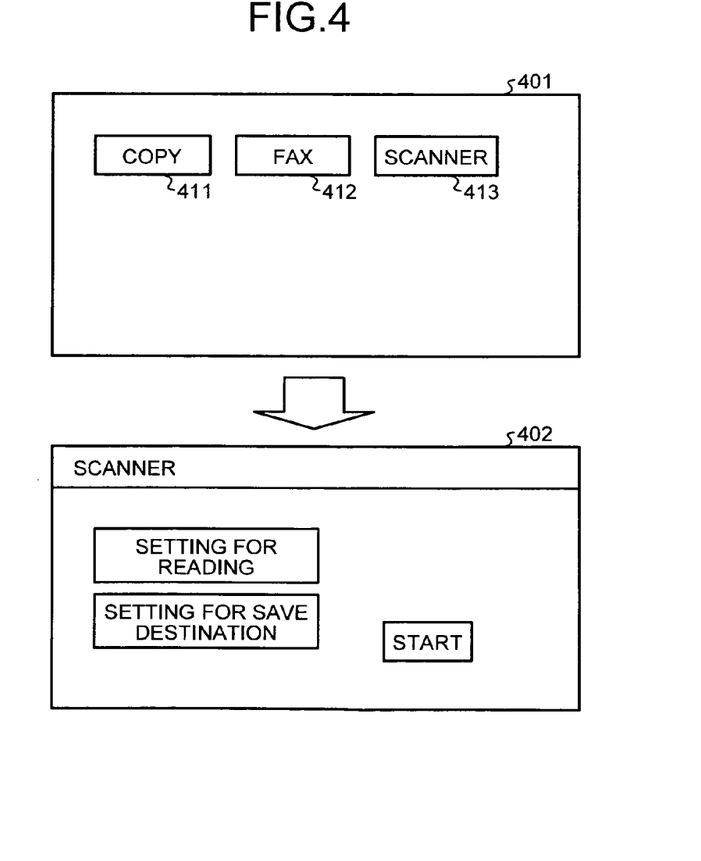
FIG. 4 is a diagram that illustrates an example where a different operation is performed according to the detected level of the pressing force of the touch panel.
Figure 5:
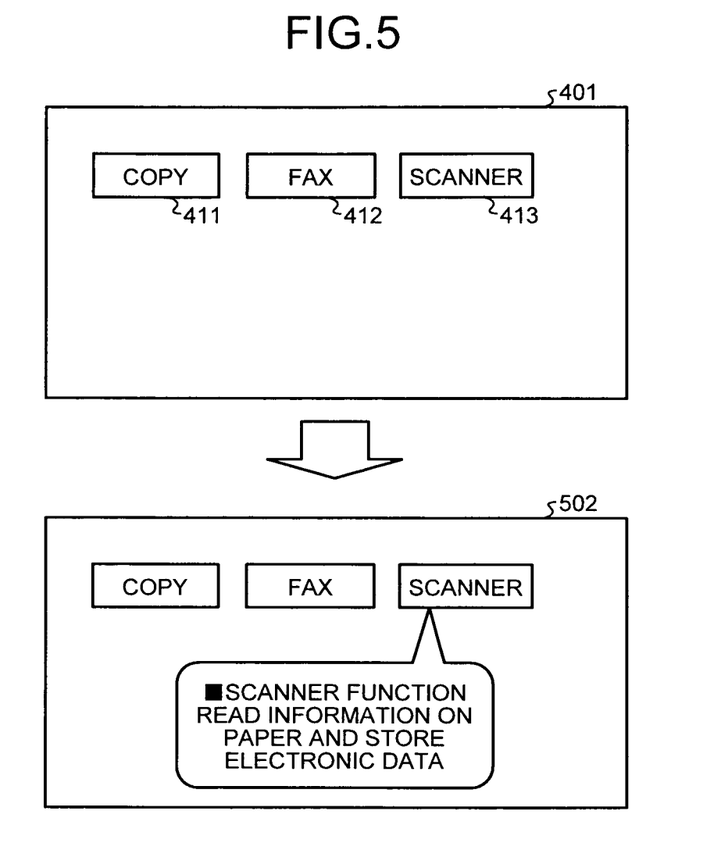
FIG. 5 is a diagram that illustrates an example where a different operation is performed according to the detected level of the pressing force of the touch panel.

FIGS. 4 and 5 are diagrams that illustrate an example where different operations are performed according to the detected level of the pressing force of the touch panel. A screen 401 illustrated in FIGS. 4 and 5 represents an example of the operation screen on which a copy button 411, a fax button 412, and a scanner button 413 are displayed corresponding to the copy function, the fax function, and the scanner function, respectively, which are selectable functions.

A screen 402 illustrated in FIG. 4 represents an example of the operation screen that is displayed when the scanner button 413 is pressed hard. Specifically, the screen 402 represents that, if the scanner button 413 is pressed hard, the scanner function that is the function assigned to the scanner button 413 is executed and, in the initial process of the scanner function, the operation screen of the scanner function for various settings (a setting for reading out, a setting for a save destination, and the like) is displayed. The process executed when the scanner button 413 is pressed hard is not limited to the above process. Any process is applicable if the process includes execution of a function assigned to the button. For example, a configuration may be such that scanning is immediately started by the scanner unit 2 with the pre-set settings.

Conversely, a screen 502 illustrated in FIG. 5 represents an example of the operation screen that is displayed when the scanner button 413 is pressed softly. Specifically, the screen 502 represents that, when the scanner button 413 is pressed softly, a function explanation screen is displayed to explain the scanner function that is the function assigned to the scanner button 413. The process executed when the scanner button 413 is pressed softly is not limited to the above process. Any process is applicable as far as the process includes execution of a function different from the function executed when the scanner button 413 is pressed hard.

Figure 6:
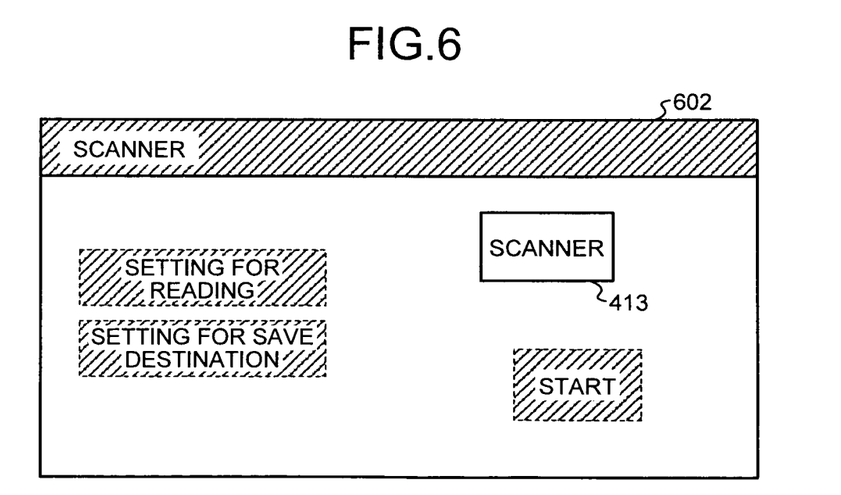
FIG. 6 is a diagram that illustrates a different example of an operation performed when a function button is pressed softly.

FIG. 6 is a diagram that illustrates a different example of an operation performed when a function button is pressed softly. A screen 602 illustrated in FIG. 6 represents another example of the operation screen that is displayed when the scanner button 413 is pressed softly. The screen 602 represents that, when the scanner button 413 is pressed softly, the preview of the operation screen for the scanner function assigned to the scanner button 413 is displayed in a display mode (halftone, or the like) that is different from the normal mode. More specifically, on the screen 602, when the scanner button 413 is pressed softly, the buttons (the copy button 411 and the fax button 412) other than the scanner button 413 are deleted, and the preview of the actual operation screen for the scanner function is paled out. At that time, the scanner button 413 and other buttons for the scanner function may be displayed so as to be overlaid.

With such a configuration, when a function assigned to a button is to be executed, it is possible to know in advance what kind of buttons need to be operated.

Figure 7:
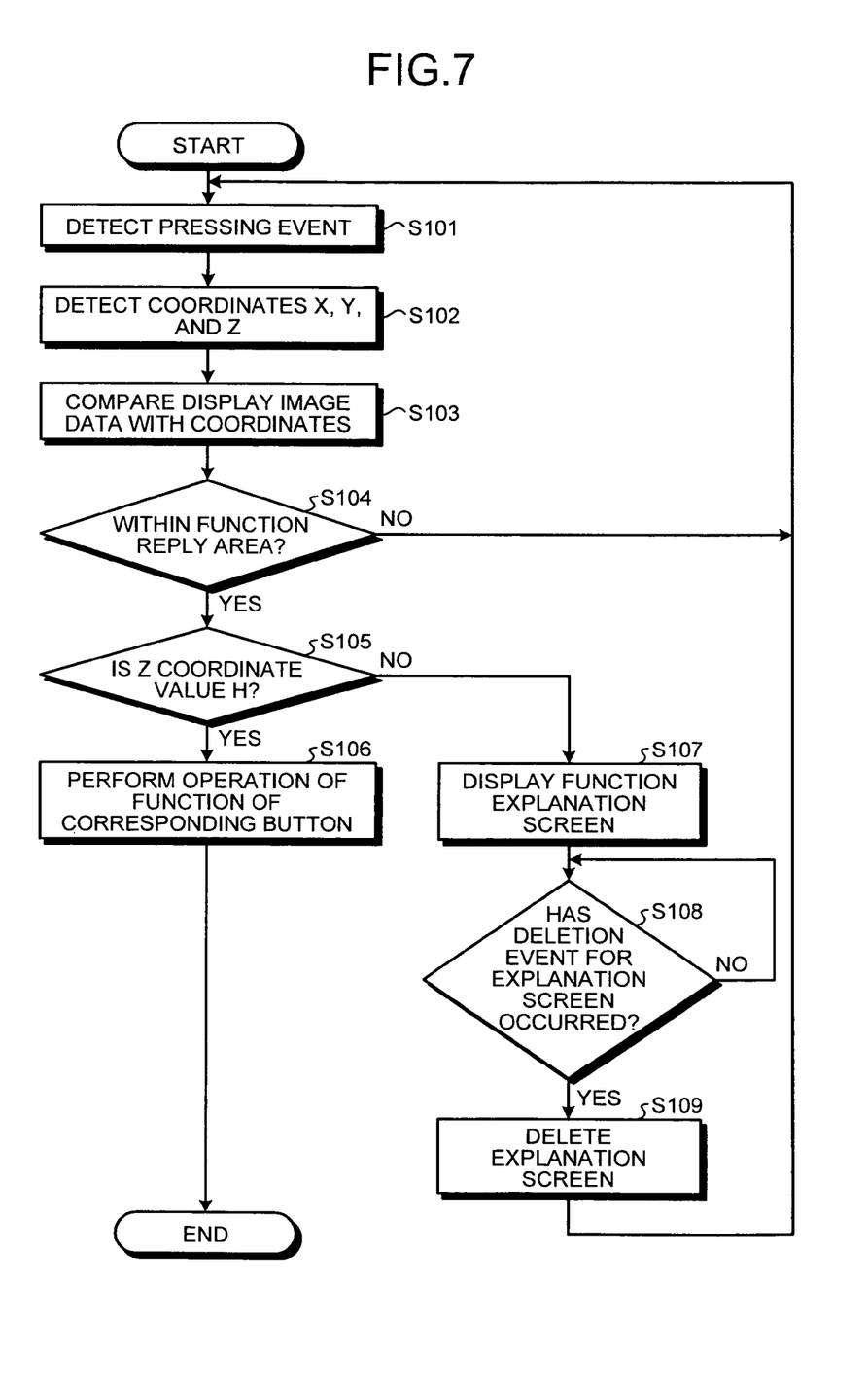
FIG. 7 is a flowchart that illustrates an example of a display process performed by the image forming apparatus according to the first embodiment.

FIG. 7 is a flowchart that illustrates an example of a display process performed by the image forming apparatus according to the first embodiment. In the following descriptions, an explanation is given, with reference to FIGS. 4, 5, and 7, of an example where the scanner button 413 is pressed on the screen 401.

When an operator presses the scanner button 413, analog voltage values change on the touch panel 3-14. The input/output control unit 3-8 detects the analog voltage values so as to detect the pressing event (Step S101) and starts a coordinate detection operation (Step S102). During the coordinate detection operation, the input/output control unit 3-8 changes the combination of electric connections with the touch panel 3-14, detects an analog voltage value in each of the directions X, Y, and Z, and performs a calculation by using these values so as to determine the coordinate values on the display panel 3-11. Specifically, if the coordinates in the directions X, Y, and Z are to be detected by using, for example, a single A/D converter, the input/output control unit 3-8 switches the route corresponding to each of the directions to be detected so as to be connected to the A/D converter and detects an analog voltage value in the detected direction.

The coordinate Z indicates the pressing force and has a value Z, L, or H in three levels. The value Z indicates a not-pressed state, the value L indicates a softly-pressed state, and the value H indicates a hard-pressed state. The three states represented by the values Z, L, and H are often treated as the numerical values 0, 1, 2, or the like, in the actual system.

If, for example, the analog voltage value in the direction Z is substantially zero (smaller than the predetermined threshold T1), the input/output control unit 3-8 determines that the pressing force is Z. If, for example, the analog voltage value in the direction Z is smaller than the predetermined threshold (for example, T2 (T2>T1)), the input/output control unit 3-8 determines that the pressing force is L, and, if the analog voltage value in the direction Z is equal to or larger than the threshold (T2), the input/output control unit 3-8 determines that the pressing force is H.

The input/output control unit 3-8 sends the X, Y, and Z coordinate values to the CPU 3-1 of the system controller 1. The control program executed on the CPU 3-1 (hereinafter, simply referred to as the CPU 3-1) compares display image data with the received X, Y, and Z coordinate values (hereinafter, referred to as input coordinate values) (Step S103).

The CPU 3-1 determines whether the X and Y coordinate values, out of the input coordinate values, fall within the display area of the button on the display screen, i.e., within the coordinate area (the function reply area) for which a predetermined function is to be executed due to pressing (Step S104). If they do not fall within the area (No at Step S104), the process is returned to Step S101 and repeated. If they fall within the area (Yes at Step S104), the function of the button corresponding to the coordinate values (the X and Y coordinate values) is selected, and the display screen is updated according to the function and the Z coordinate value.

Specifically, the CPU 3-1 determines whether the Z coordinate value is H, i.e., whether the value for the hard-pressed state is indicated (Step S105). If the Z coordinate value is H (Yes at Step S105), it is determined that the execution of the scanner function is selected and, as illustrated in FIG. 4, the CPU 3-1 starts the scanner function, displays the screen 402 by which the scanner function can be operated (Step S106), and waits for a subsequent instruction from the operator.

If the Z coordinate value is not H, i.e., if the Z coordinate value is L (No at Step S105), it is determined that the display of the function explanation screen for the button is selected and, as illustrated in FIG. 5, the CPU 3-1 displays the function explanation screen (the screen 502) to which the function explanation for the pressed button is added such that it is overlapped with the screen 401 (Step S107). Afterward, the CPU 3-1 determines whether a change in the input to the touch panel 3-14 (a deletion event for the explanation screen) has occurred, for example, the operator removes his/her hand from the screen or presses the screen again (Step S108). If the deletion event has not occurred (No at Step S108), the process is repeated until the event occurs. If the deletion event has occurred (Yes at Step S108), the function explanation screen is deleted (Step S109), the screen 401 illustrated in FIG. 4 or 5 is displayed again, and awaits an instruction from the operator.

An explanation is given, with reference to FIG. 6, of an operation performed in another screen transition example if the scanner button 413 is pressed softly on the screen 401.

When the Z coordinate value at the coordinate position on the scanner button 413 is L, i.e., when the scanner button 413 is pressed softly (No at Step S105), the CPU 3-1 determines that the preview of the operation screen of the button function is selected and, as illustrated on the screen 602 in FIG. 6, the operation screen of the scanner function is paled out and the softly pressed scanner button 413 is continuously displayed. When the pressing of the scanner button 413 is released (Yes at Step S108), the CPU 3-1 cancels a change to the scanner function, deletes the previewed operation screen of the scanner function, displays the screen 401 illustrated in FIG. 4 or 5 again, and waits for an instruction by the operator. The release of pressing here means that the Z coordinate value becomes "Z (the not-pressed state)".

If the scanner button 413 is pressed hard while the operation screen of the scanner function is being previewed (not illustrated in FIG. 7), the CPU 3-1 selects the scanner function, deletes the display of the scanner button 413, returns the colors of the paled-out operation screen of the scanner function to the normal colors so as to indicate that the operation screen can be operated, and receives a subsequent operation.

Thus, in the image forming apparatus (the operation display device) according to the first embodiment, the pressing level on the touch panel has two levels of detection, i.e., high and low, and a different function is executed that is determined according to the pressing force. Thus, it is not necessary to perform a troublesome operation such that, for example, in order to display an explanation of a function of a button or icon displayed on an operation panel, a separately-located specific button, for example, a help function button is pressed once and then the above button or icon is pressed. Therefore, the addition of operations and an increase in the number of displayed elements are not necessary. The corresponding function operation can be selected by pressing the above button or icon hard, and the function explanation screen of the corresponding button or icon can be displayed by pressing the button or icon softly.

Modified Example 1

Like the first embodiment, in the operation display device that has a function such that a button is pressed softly to display an explanation of the function of the button, the function explanation screen may be displayed mistakenly if the actual pressing force is weak although the operator tried to press the button hard or if the threshold is not appropriate upon determination of the coordinate Z. At that time, if the function explanation screen is once deleted and then the corresponding button is pressed again, operability deteriorates. In a modified example 1, in order to prevent such a problem, if the scanner button 413 is pressed softly on the screen 401, a selection screen is displayed to prompt the selection of whether the function explanation screen is to be displayed.

Figure 8:
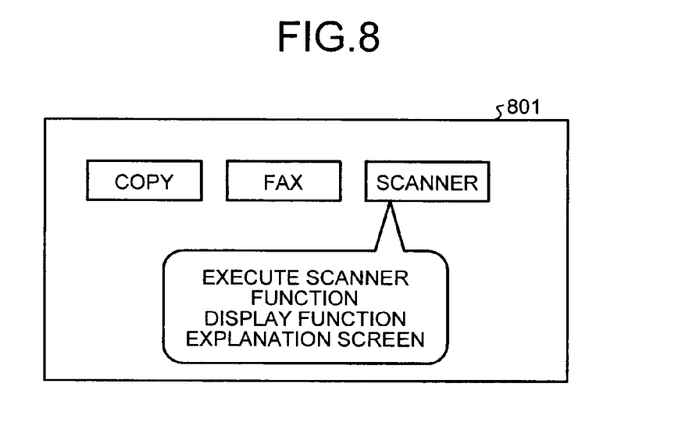
FIG. 8 is a diagram that illustrates an example of a selection screen.

According to the modified example 1, if the Z coordinate value on the coordinate position of the scanner button 413 is L, i.e., if the scanner button 413 is pressed softly (No at Step S105), it is determined, in the same manner as the first embodiment, that the display of the function explanation screen of the corresponding button is selected. Afterward, according to the modified example 1, the CPU 3-1 does not display the function explanation screen immediately. As illustrated in FIG. 8, the CPU 3-1 displays a selection screen 801 to prompt the selection of whether the function of the button is to be immediately executed or the function explanation screen is to be displayed.

The operator again presses any one of the options in accordance with the displayed selection screen 801. The pressed position is again sent from the input/output control unit 3-8 to the CPU 3-1. The CPU 3-1 compares the display image data with the input coordinate values and, in accordance with a selection result, displays the function explanation screen or executes a process of the function of the corresponding button.

Figure 9:
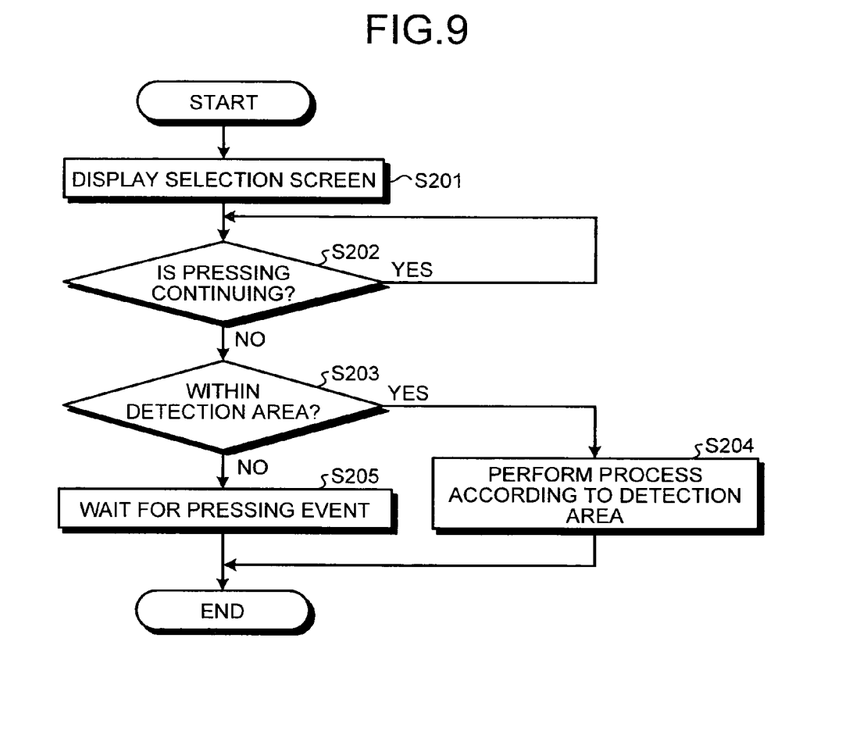
FIG. 9 is a flowchart that illustrates a process performed when an operation selection instruction is received while the touch panel is pressed.

A configuration may be such that the selection screen 801 receives an operation selection instruction while the touch panel 3-14 is pressed. FIG. 9 is a flowchart that illustrates a process performed if an operation selection instruction is received while the touch panel 3-14 is pressed.

Upon detecting that the scanner button 413 is pressed softly (for example, No at Step S105 in FIG. 7), the CPU 3-1 displays the selection screen 801 illustrated in FIG. 8 without waiting to detect that the operator has removed his/her hand from the button or the touch panel 3-14 (Step S201). The CPU 3-1 determines whether the pressing is still continuing (Step S202) and, if the pressing is still continuing (Yes at Step S202), the process is repeated until the pressing is stopped. If it is determined that the pressing is not continuing (No at Step S202), the CPU 3-1 determines whether the pressed state of the touch panel 3-14 is cancelled in each detection area on which the X and Y coordinate values correspond to the options within the selection screen (Step S203). If the pressed state is cancelled within the detection area (Yes at Step S203), the CPU 3-1 determines the coordinates X and Y at the position where the pressed state is cancelled as the values selected by the operator and performs a process according to the detection area on which the pressing is stopped (Step S204). Specifically, the CPU 3-1 displays the function explanation screen or executes a process of the function of the corresponding button.

If the pressed state is cancelled outside the detection area of the selection screen (No at Step S203), a pressing event is waited (Step S205), and the CPU 3-1 waits for detection of the pressing within the detection area.

According to the modified example 1, before the function explanation screen is displayed, the selection screen is displayed to prompt the selection of whether the function explanation screen is to be displayed; therefore, it is possible to prevent an operation mistake such that the function explanation is mistakenly selected. Furthermore, when the confirmation screen is displayed once, the selection of a function can be completed on the confirmation screen while the touch panel is being touched; therefore, it is possible to reduce the number of input operations necessary for manipulation.

Modified Example 2

Figure 10:
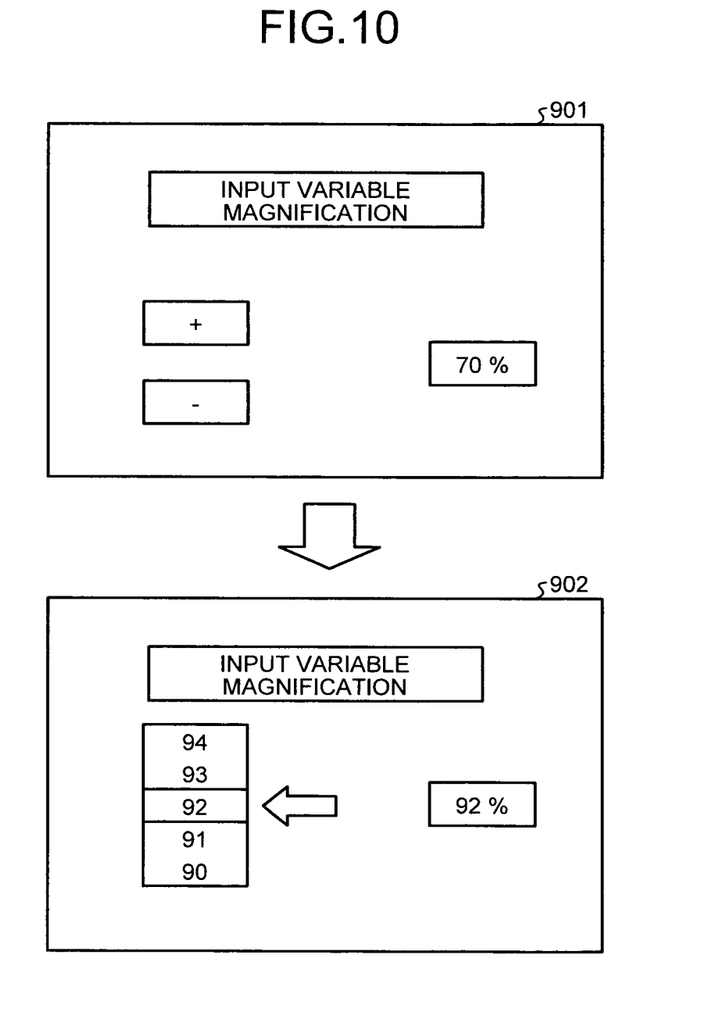
FIG. 10 is a diagram that illustrates a method for displaying a different setting screen in accordance with the pressing force.

In a modified example 2, an explanation is given of an example where, as a setting screen for input of a set value of a function, a different setting screen is displayed in accordance with the pressing force on the touch panel. FIG. 10 is a diagram that illustrates a method for displaying a different setting screen in accordance with the pressing force.

For example, when the variable magnification function is selected on the operation screen of the copy function, a screen, such as a setting screen 901 illustrated in FIG. 10, is often displayed. In some cases, a screen is used on which a plurality of buttons with frequently-used magnifications is arranged. On the setting screen 901 illustrated in FIG. 10, the variable magnification is increased or decreased with respect to the current value by an input method using a plus button and a minus button.

In such a case, the pressing level of the touch panel 3-14 has two levels of detection, i.e., high and low. If the CPU 3-1 detects that the plus button or the minus button is pressed hard, the set magnification is increased or decreased by a predetermined numerical value, and the result is displayed on the screen.

Conversely, if the CPU 3-1 detects that the plus button or the minus button is pressed softly, a setting screen 902 is displayed on which a list of settable values is displayed as illustrated in the lower portion of FIG. 10. Upon detecting tracing the list in an up-and-down direction, the CPU 3-1 displays a list in a new range of numerical values by scrolling the display of the list up and down. When the CPU 3-1 detects that the touch panel 3-14 is pressed on the area of the numerical value that is in the middle of the list and is surrounded by the lines as indicated by the arrow in FIG. 10 or on the area of the numerical value that is displayed in a highlighted manner, or the like, or when the CPU 3-1 detects the pressing on a button area (not illustrated) that is displayed as "OK" or "decide", the result is displayed on the screen and the corresponding numerical value is stored as a set value.

According to the modified example 2, a different setting screen is displayed when a button for input of a setting is pressed hard or softly so that it is possible to selectively provide an input method that is easier to use for an operator.

Modified Example 3

Figure 11:
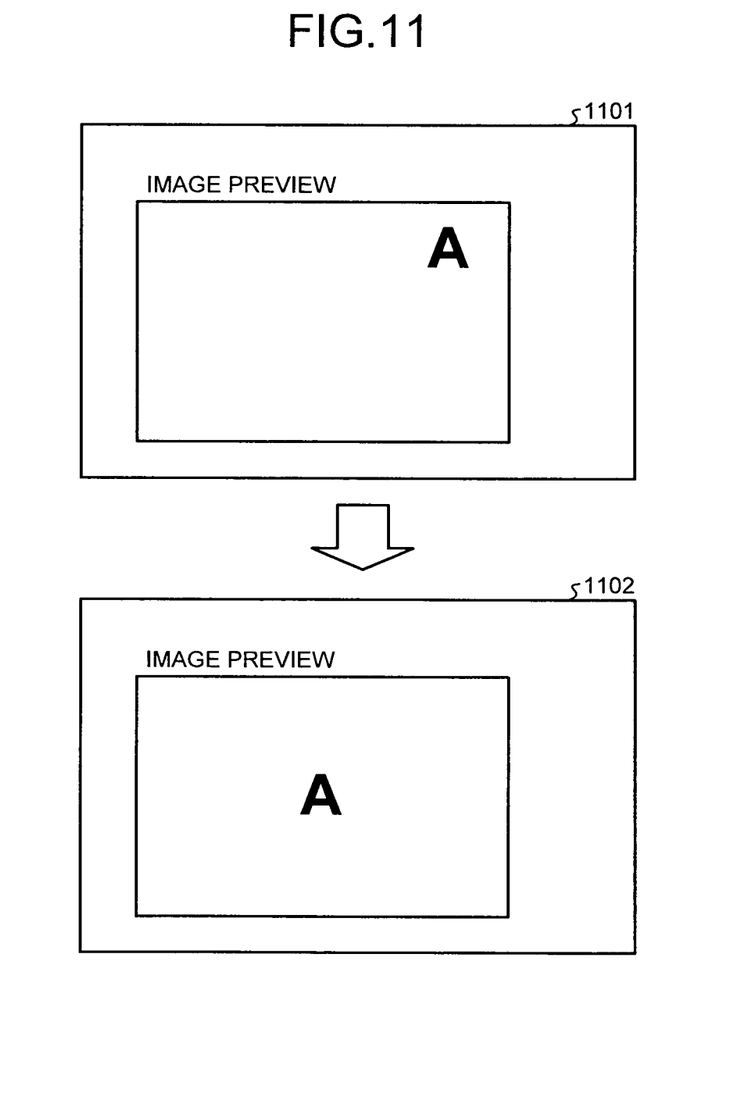
FIG. 11 is a diagram that illustrates an example where image movement and enlargement operation are alternatively performed in accordance with the pressing level.
Figure 12:
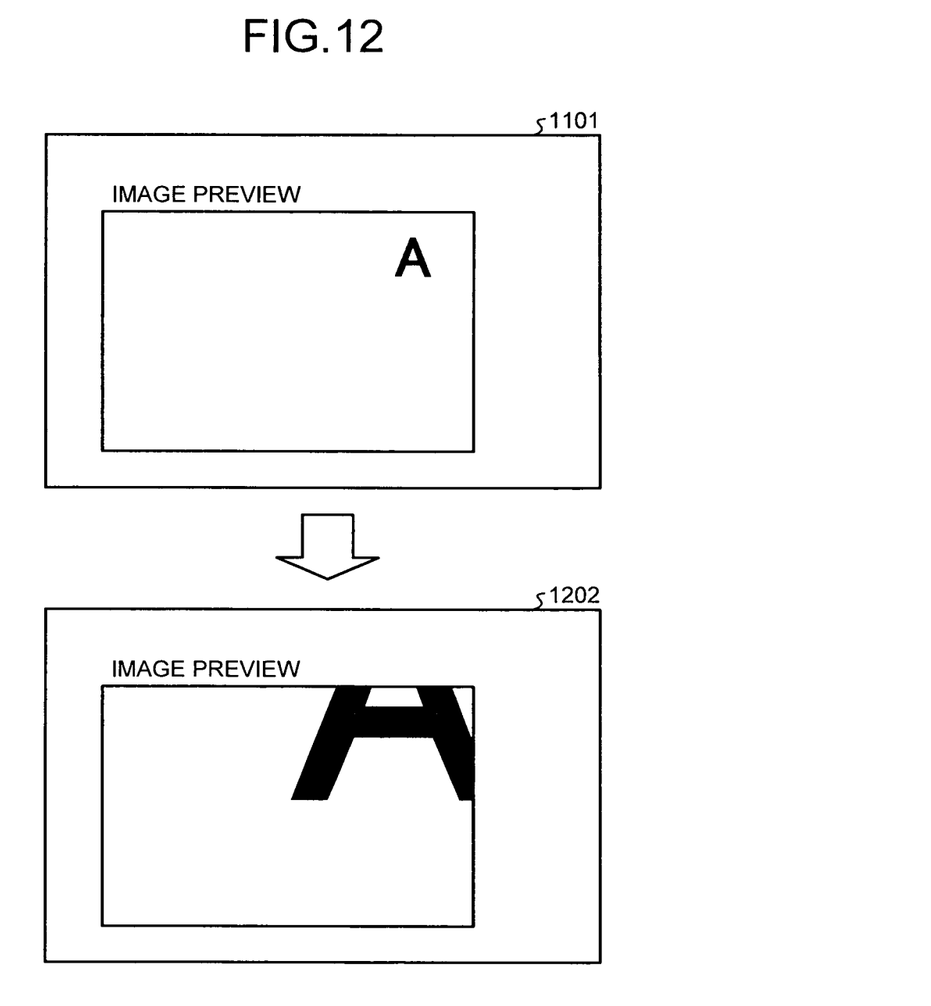
FIG. 12 is a diagram that illustrates an example where image movement and enlargement operation are alternatively performed in accordance with the pressing level.

In a modified example 3, an explanation is given to an example where image movement and enlargement operation are alternatively performed in accordance with the pressing level. FIGS. 11 and 12 are diagrams that illustrate an example where image movement and enlargement operation are alternatively performed in accordance with the pressing level.

FIGS. 11 and 12 illustrate an example of a confirmation screen 1101 for checking the preview of an image read using the scanner function. In the modified example 3, a configuration is such that the pressing level of the touch panel 3-14 has two levels of detection, i.e., high and low, so that, even if the same coordinates are pressed to input an instruction, two different inputs can be obtained. Specifically, if image data (image preview, or the like) displayed on the operation panel 3 is pressed hard, the CPU 3-1 performs a process of moving the display area such that the pressed position is located at the center of the screen. FIG. 11 illustrates an example where, if "A" on a confirmation screen 1101 is pressed, a confirmation screen 1102 is displayed on which "A" is displayed at the center of the screen.

If the image data is pressed softly, the CPU 3-1 performs a process of displaying the image near the pressed position in an enlarged manner while it is being pressed. FIG. 12 illustrates an example where, if "A" on the confirmation screen 1101 is pressed, a confirmation screen 1202 is displayed on which the image near "A" is displayed in an enlarged manner.

It may be controlled such that the enlarged image is displayed only while it is pressed softly or the enlarged image is displayed when it is pressed softly once and, when the image is pressed again, the display of the enlarged image is deleted.

According to the modified example 3, the periphery of corresponding coordinates can be displayed in an enlarged manner only when it is pressed softly; therefore, for example, upon displaying image file data, it is possible to reduce the number of input operations necessary for manipulation to check the enlarged display in a partially detailed manner.

Second Embodiment

Figure 13:
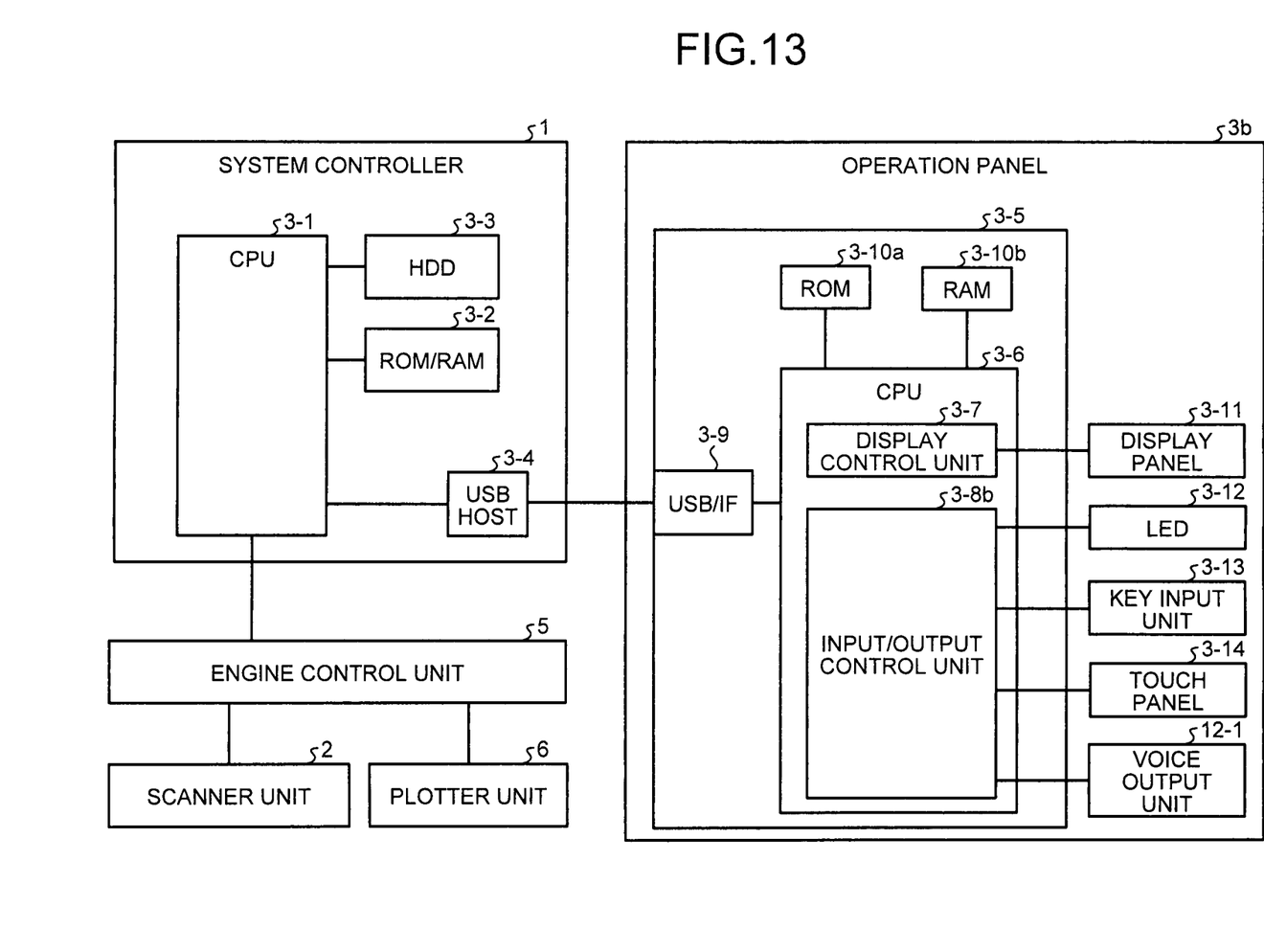
FIG. 13 is a diagram that illustrates a configuration example of an image forming apparatus according to a second embodiment.

An explanation is given so far of an example where an explanation of a function is output by displaying a function explanation screen on the display panel 3-11. In a second embodiment, an explanation is given of an example where the name of a button or icon displayed on an operation screen is read out by voice. FIG. 13 is a diagram that illustrates a configuration example of an image forming apparatus according to the second embodiment. The second embodiment is different from the first embodiment in that an operation panel 3b includes a voice output unit 12-1 and an input/ output control unit 3-8*b* further includes a function of controlling a voice output process obtained from the voice output unit 12-1.

When a button is pressed hard, the CPU 3-1 performs the function of the button per se; when the button is pressed softly, the CPU 3-1 receives, from a storage device, input of voice data on the name of the function related to the button or on the outline of the function; and the CPU 3-1 requests the input/output control unit 3-8*b* to send the input voice data to the voice output unit 12-1. The input/output control unit 3-8*b* executes a reading process by voice output in response to the request. The storage device that stores voice data may be the HDD 3-3, the ROM/RAM 3-2, the ROM 3-10*a*, the RAM 3-10*b*, or the like.

According to the second embodiment, it is possible that the name or the outline of a function related to a corresponding button or icon can be read by voice output when it is pressed softly; thus, even a vision-impaired operator can recognize what kind of functions are arranged on the screen.

According to an aspect of the present invention, an advantage is produced such that the operability of an operation display device with a touch panel can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An operation display device comprising:
    a display unit configured to display at least one icon to which a predetermined function is assigned;
    a touch panel that is mounted on the display unit;
    a detecting unit configured to detect a pressed position on the touch panel and detect a pressing force against the touch panel; and
    an execution control unit connected to the display unit, the touch panel and the detecting unit, wherein
    when one of the at least one icon is selected, if the pressing force is equal to or less than a predetermined threshold, the execution control unit causes the display unit to delete any icons other than the selected icon and causes, under a condition in which the pressing force is kept at equal to or less than the threshold, the display unit to display, instead of the deleted icons, at least one sub-icon to which a predetermined operation corresponding to at least one function of the selected icon is assigned in a paled out state, and then if the pressing force is changed to more than the threshold, the execution control unit executes an operation of function which is assigned to the selected icon and causes the selected icon to be deleted and the paled out sub-icon to be displayed in normal colors to receive a subsequent operation.

2. An operation display method performed by an operation display device,
    the operation display device including
        a display unit configured to display at least one icon to which a predetermined function is assigned;
        a touch panel that is mounted on the display unit;
        a detecting unit configured to detect a pressed position on the touch panel and detect a pressing force against the touch panel; and
        an execution control unit connected to the display unit, the touch panel and the detecting unit,
    the operation display method comprising:
    displaying at least one icon to which a predetermined function is assigned;
    selecting one of the at least one icon by pressing the touch panel;
    detecting a pressed position on the touch panel and a pressing force with respect to the touch panel;
    if the pressing force is more than a predetermined threshold, by the execution control unit, causing an operation of function which is assigned to the selected icon, and
    if the pressing force is equal to or less than the threshold, by the execution control unit, causing the display unit to delete any icons other than the selected icon and causes, under a condition in which the pressing force is kept at equal to or less than the threshold, the display unit to display at least one sub-icon to which a predetermined operation corresponding to at least one function of the selected icon is assigned in a paled out state, and then if the pressing force is changed to more than the threshold, the execution control unit executes an operation of function which is assigned to the selected icon and causes the selected icon to be deleted and the paled out sub-icon to be displayed in normal colors to receive a subsequent operation.

3. The operation display device according to claim 1, wherein the icon and the sub-icon are displayed so as to be overlaid on the display unit.

4. The operation display device according to claim 1, wherein the icon comprises an image of a character, button, or key.

* * * * *